Jan. 19, 1937.  J. E. MURPHY  2,068,191
TRACTOR SWEEP RAKE
Filed Dec. 5, 1935  3 Sheets-Sheet 1
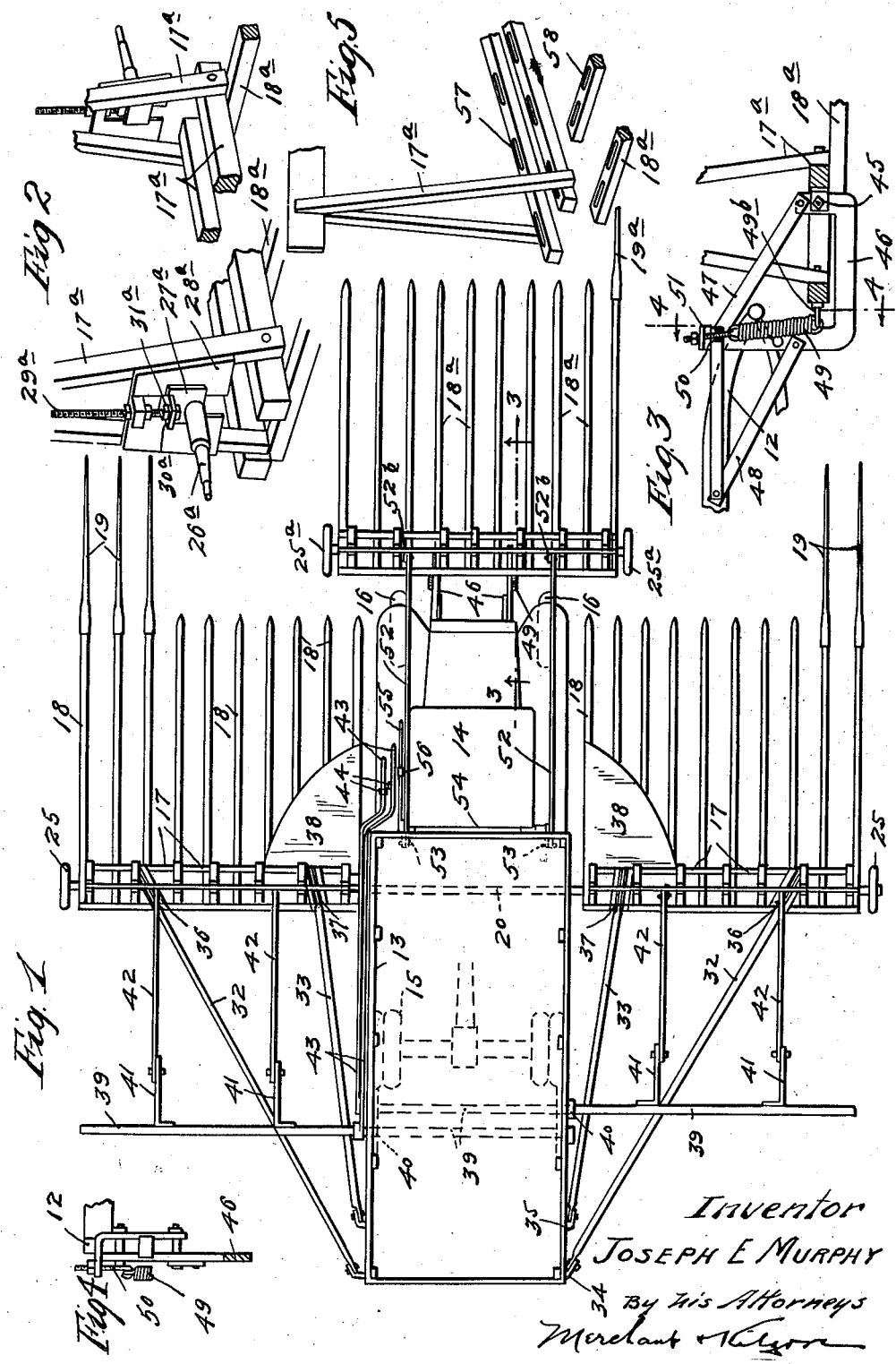
Inventor
JOSEPH E MURPHY
By his Attorneys
Merchant Kilgore

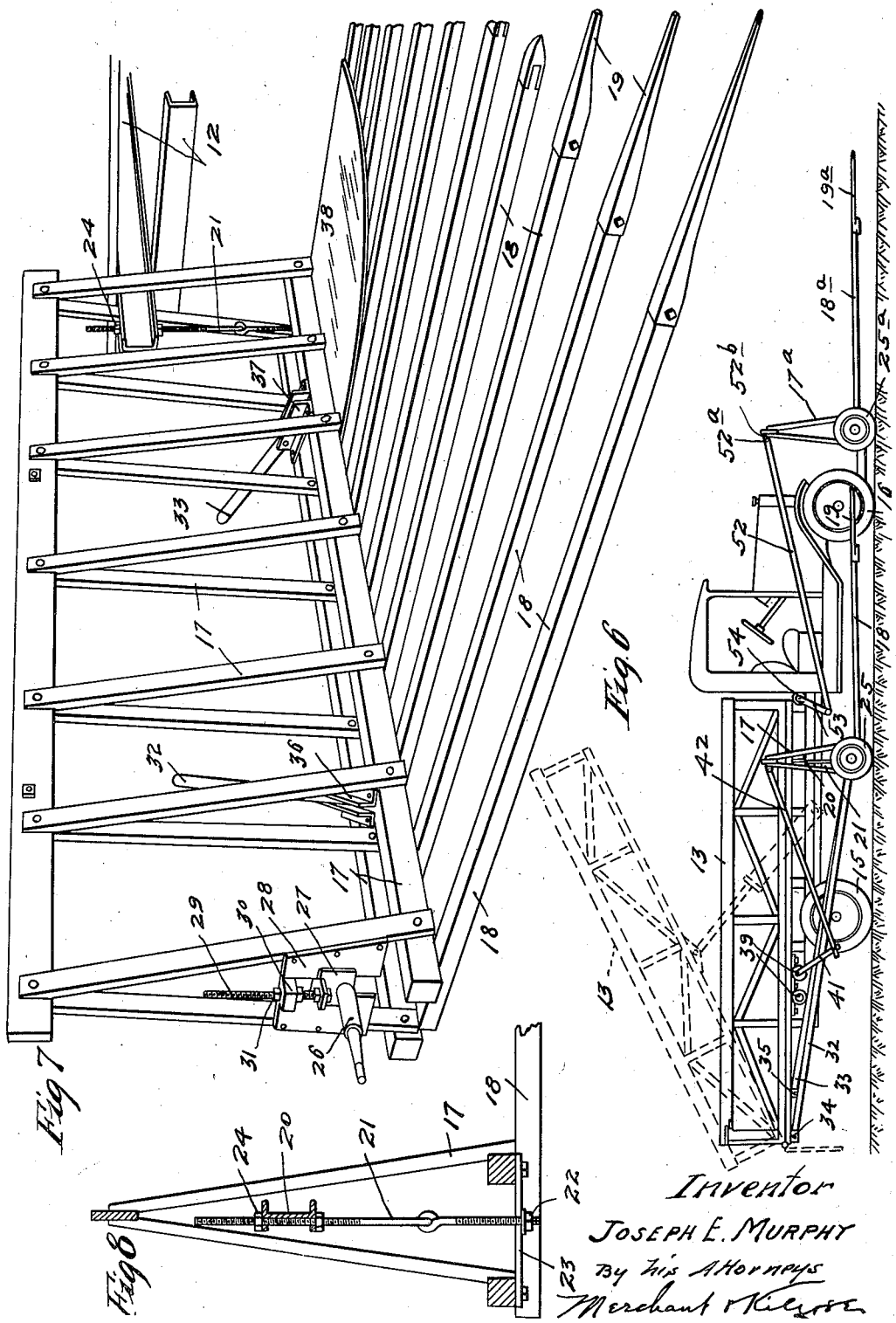

Jan. 19, 1937.　　　　J. E. MURPHY　　　　2,068,191
TRACTOR SWEEP RAKE
Filed Dec. 5, 1935　　　3 Sheets-Sheet 3
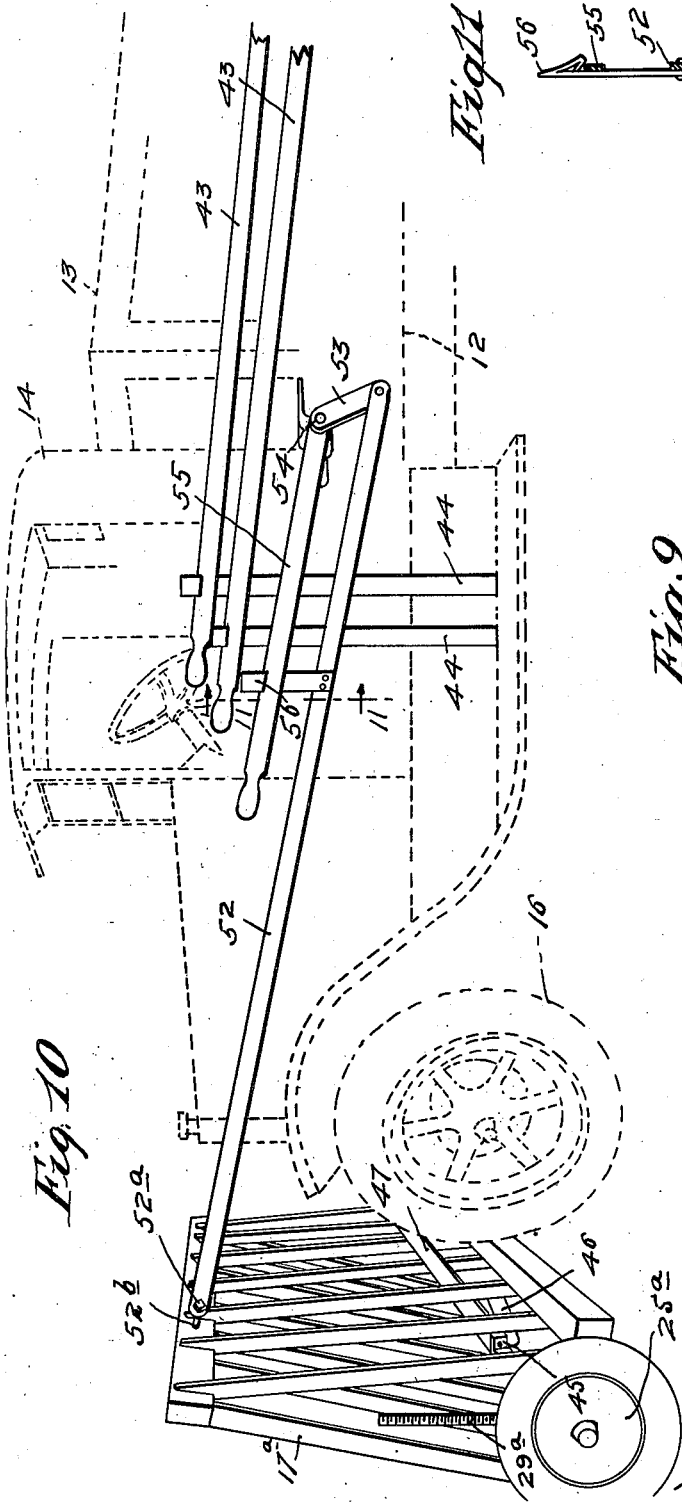
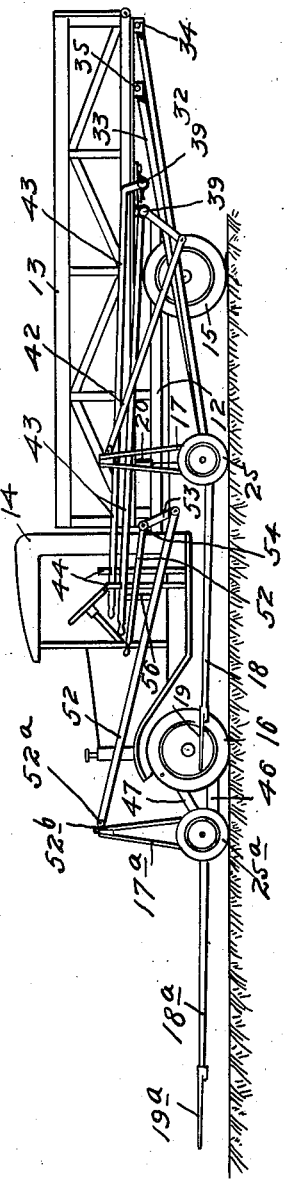
Inventor
Joseph E. Murphy
By his Attorneys
Merchant & Kilgore Patented Jan. 19, 1937

2,068,191

UNITED STATES PATENT OFFICE 2,068,191

TRACTOR SWEEP RAKE

Joseph E. Murphy, Minneapolis, Minn.

Application December 5, 1935, Serial No. 52,983

5 Claims. (Cl. 56—27)

My invention provides an improved and highly efficient tractor sweep rake and generally stated, consists of the novel devices, combinations of devices and arrangement of parts hereinafter described and defined in the claims.

In this specification, the term "tractor" is used in a broad sense to include a power-driven tractor-propelled vehicle and the term "truck" is used in a more specific sense to include a relatively high-speed tractor provided with a rack or body for carrying a load.

This rake device is especially designed for picking up hay, alfalfa, or grain that is either loose or in shocks, and to carry the same to stackers. My invention includes means for connecting the rakes to relatively high-speed trucks which make it possible to pick up, deliver the picked up load to stackers or the like, and to rapidly return to the field for repetition of the actions. The relative arrangement of a plurality of rakes adapt the apparatus for rapid and efficient loading and carrying both of loose hay or alfalfa and grain that has been bound into bundles and distributed along the field or collected in shocks.

For example, in the use of a commercial rake designed in accordance with my invention, the trucks have been safely driven empty from the mechanical stackers, to the field at the rate of from twenty to twenty-five miles an hour; the hay gathered from windrows at the rate of from five to fifteen miles per hour; and the load consisting of more than a thousand pounds, delivered to the stackers at the rate of fifteen miles per hour. Obviously, this rapid gathering of the hay or grain when it is just in the right condition, minimizes danger of damage thereof from rain or from over-exposure to the sun.

It is a known fact that much of the alfalfa meal is shipped from western dry climates where they experience little or no rainfall, and which enables alfalfa growers to maintain both color and protein values. The use of this equipment makes it possible for growers in more moist climates such as Minnesota and Wisconsin, to attain the same values as were hitherto obtained in the drier climates.

In its most complete form, the invention comprises three rakes, to wit: an advance rake located directly in front of the truck and one rake carried at each side of the truck at the rear of the advance rake. For picking up hay or alfalfa, all three rakes may be used, but for picking up shocks of grain, preferably only the two side rakes will be used, and the centrally located advance rake preferably removed.

Referring to the drawings, which illustrate a complete commercial form of the invention, and wherein like characters indicate like parts throughout the several views:

Fig. 1 is a plan view showing the several rakes attached to a truck, in accordance with my invention;

Fig. 2 is a fragmentary perspective with some parts broken away, showing the central or advance rake;

Fig. 3 is a section taken on the line 3—3 of Fig. 1;

Fig. 4 is a section taken on the line 4—4 of Fig. 3;

Fig. 5 is a view corresponding to Fig. 2, showing certain of the elements of the front rake support;

Fig. 6 is a side elevation of the truck and rake shown in Fig. 1;

Fig. 7 is a perspective showing one of the side rakes;

Fig. 8 is a section taken on the line 8—8 of Fig. 7;

Fig. 9 is a view looking at the truck and rake attachments from the left or controlling side;

Fig. 10 is an enlarged view with some parts in diagram and some parts broken away looking at the truck and connections from the controlling side; and Fig. 11 is a fragmentary section taken on the line 11—11 of Fig. 10.

The tractor illustrated is a relatively high-speed truck, having a hydraulically operated dump rack or body. Of the parts of this truck, for the purposes of this case, it is desirable to particularly note the chassis frame 12, the dumping rack or body 13, the operator's cab 14, the rear tractor wheels 15 and the front or steering wheels 16. Inasmuch as the truck is designed to run at quite high speed, the wheels 15 and 16 are preferably equipped with pneumatic tires.

The side rakes, preferably one on each side of the tractor, each comprises a trussed rake back 17 and forwardly projecting tines 18, the tips of which latter are preferably provided with long rod-like metallic prongs 19. These prongs 19 have sockets into which the tips of the tines 18 extend and are detachably secured thereto by set-screws. To connect these side rakes to the chassis frame 12, transversely extended anchoring beams 20 are rigidly secured to the latter and the inner end portions of the rake backs 17 are connected to the projecting ends of the corresponding beams 20 by hanger rods 21. These hanger rods 21, as shown, are jointed, and their lower ends are passed through and secured by nuts 22 to metal straps 23 that are rigidly secured to the lower beams of said rake back. The threaded upper ends of said hanger rods 21 are shown as passed through flanges of the respective beams 20 and adjustably anchored thereto by nuts 24. Said side rakes at their outer sides are preferably supported by wheels 25 equipped with pneumatic tires.

The wheels 25 are journaled in trunnions or stub axles 26 that project outward from heads 27 that are slidably mounted for vertical adjustments in guide plates 28 rigidly secured to the outer end portions of the respective rake back 17. To provide for vertical adjustments of the heads 27 and hence of the rake backs in respect to the wheels 25, threaded bolts 29 are secured to said heads 27 and are passed loosely through lugs 30 on said plates 28 and are provided with nuts 31 for effecting the above noted adjustment. The side rakes above noted are held for forward travelling movements with the truck by means of oblique thrust or push rods 32 and 33, the rear ends of which are pivotally anchored to lugs or brackets 34 and 35, respectively, secured to the chassis frame 12. The front ends of the push bars 32 and 33 are pivotally connected, respectively, to flanges 36 and 37 rigidly secured on the lower beams of the said side rakes, see particularly Figs. 1 and 7. For an important purpose which will presently appear, platforms 38 on which pitchers may stand, are secured on the rear portions of the inner tines of the said side rakes.

For raising and lowering the front ends of the tines of the side rakes, manually operated connections are provided. For each side rake there is a rock shaft 39 journaled in suitable bearings 40 on the frame 12 and projecting one from each side of said frame at the rear of the respective side rakes. These rock shafts are provided with depending arms 41, which by links 42, are pivotally connected to the upper beams of the respective rake backs, as best shown in Figs. 1, 6 and 9.

On the left-hand side of the truck frame 12 is a pair of long levers 43, the rear ends of which levers are rigidly secured to the respective rock shafts 39. When levers 43 are depressed, the front ends of the tines of the side rakes will be raised or angularly rocked upward on the wheels 25 and jointed hanger rods 21. When said levers are released, the front ends of the tines of said side rakes will be brought in contact with or close to the ground. To secure the levers 43 in depressed position with the front ends of the tines of the side rakes raised, as is desirable when the truck is carrying a load or returning for a load, the front ends of said levers are arranged to be detachably engaged with latch bars 44, the lower ends of which are anchored to the truck frame or other permanent part of the truck. By these connections, it is obvious that the two side rakes may be independently adjusted.

The centrally located front rake in its general features of construction, is like the side rakes previously described. It comprises a trussed rake back 17a and tines 18a. This front rake, however, is mounted on and supported in part by two tire-equipped wheels 25a, see particularly Figs. 1, 2 and 9, journaled on trunnions or stub axles 26a secured to the heads plates 27a, that are slidably mounted for vertical adjustments in guide plates 28a rigidly secured to the outer end portions of the respective rake backs 17a. To provide for vertical adjustments of the heads 27a, and hence of the front rake wheels 25a, threaded bolts 29a are secured to the heads 27a and are passed loosely through lugs 30a and are provided with nuts 31a for affording the above noted adjustments. Prongs 19a are removably applied to the tips of the tines 18a, are substantially like the prongs 19 and are removably held in place in the same manner.

The rake back 17a is connected by nut-equipped pivot bolts 45, see Fig. 3, to L-shaped brackets 46 that are rigidly secured by truss bars 47 and 48 to the forwardly projecting side bars of the chassis frame 12. The pivots 45 it will be noted, are located forward of the extreme rear portion of the base of the rake back 17a. Coiled springs 49 are attached to projections 49b on the rear portions of the base of the rake back 17a and are hung from lugs 51 rigidly secured on the truss bars 47. The springs 49 tend to keep the tines 18a down and close to the ground.

For raising and lowering the front ends of the tines 18a on the wheels 25a and the pivots 45, long links 52, see particularly Fig. 10, are pivotally connected by bolts 52a to projections 52b. At the rear ends, links 52 are pivotally connected to crank arms 53 of a rock shaft 54, that is journalled in suitable bearings on the chassis frame 12. At one side, to wit: at the same side as the levers 43, a third lever 55 is secured to the rock shaft 54 and is engageable with a latch bar 56 which, as shown, is attached to the adjacent link 52.

For different kinds of work, different spacing of the tines of the rakes is desirable. Fig. 5 illustrates this adjustability applied to the front rake, but it may also be applied to the side rakes and, in fact, such adjustments are important in connection with the side rakes. In Fig. 5, the lower bars of the rake back 17a are formed with slots 57 and the tines 18a are shown as provided with slots 58. By means of nut-equipped bolts passed through the slots 57 and 58, it is evident that variable spacing of the tines can be readily produced.

*Summary of operation*

For gathering hay or alfalfa from windrows or loose on the ground, all three of the rakes will preferably be applied and used. Under forward movement of the rakes, a wide swarth of hay, alfalfa or the like will be picked up and loaded on the rakes under rapid advance movement, which, as indicated, may vary from five to fifteen miles per hour. When the rakes have been well loaded, their tines will be raised from the ground and the truck with the rakes may be driven to the mechanical stackers or elsewhere and there quickly deposited when the rakes are lowered, simply by a backing up movement of the truck.

For gathering of shocks of grain, it is advisable to detach the front rake and this may be done simply by removing the bolts 45, 50a and 52a. The grain shocks will be located in rows so spaced that under forward movement of the truck, the laterally spaced rakes will simultaneously pick up two rows of shocks. This pick-up action, as stated, may be performed very rapidly. In gathering shocks or bundles of grain with both of the side rakes attached, a bundle pitcher will stand on each of the platforms 38 and they will throw the bundles gathered by the rakes into the rack or box 20 of the truck. This pitching action of course, will continue under forward movement of the truck and while bundles are being continuously gathered by the rakes. It will be noted by reference particularly to Fig. 1, that the platforms 38 are located close to the front corners of the rack 13. When the rack has been located and the rack driven to the point of deposit, the load can be quickly dumped by elevating the rack into the inclined position shown by dotted lines in Fig. 6.

In actual practice, it has been found that with the front rake and one side rake attached, or when only one side rake is attached, there will be a side draft on the tractor or truck that is objectionable, but that with all three rakes attached, or with only the side rakes attached, the side draft will be equalized or substantially eliminated.

From the foregoing, it is evident that the device described not only reduces the amount of labor and cost required to gather and deliver hay, alfalfa and grain, but performs the work with such rapidity that large areas may be gathered at the time when the hay, alfalfa or grain is in just the condition for gathering, threshing or other treatment. Obviously, from the foregoing, the attachment of the rakes to a commercial truck or tractor, requires no modification of the truck or tractor and it therefore follows that after harvest time, the rake attachments may be detached and the tractor or truck utilized for its ordinary purposes. It is further evident that the preferred construction and arrangement illustrated in the drawings may be variously modified and within the scope of the invention herein disclosed and broadly claimed.

What I claim is:

1. The combination with a tractor, of a cross beam rigidly secured to the tractor frame and projecting at the side thereof, a rake having a back with permanently secured forwardly projecting tines located below the projecting end of said cross beam, a link suspending the inner end of said rake back from the projecting end of said beam, a ground-engaging wheel journaled to the outer end of said rake back, oblique thrust-acting push bars connecting the lower portion of said rake back to the side of the tractor frame, and operating connections for oscillating said rake back on said link and supporting wheel to raise and lower the tines thereof.

2. The combination with a truck having a carrying rack, of a rake connected to the frame of said truck and located at one side thereof with its rear portion adjacent the front portion of said rack, said rake having a platform applied on its tines adjacent to said carrying rake upon which a bundle pitcher may stand to throw bundles from said rake onto said rack.

3. The combination with a truck having a carrying rack, of a rake connected to the frame of said truck and located at one side thereof with its rear portion adjacent the front portion of said rack, said rake having a platform applied on its tines adjacent to said carrying rake upon which a bundle pitcher may stand to throw bundles from said rake onto said rack, said rack being tiltable to discharge its load.

4. The combination with a tractor, of a front rake comprising a rake back with permanently secured forwardly projecting tines, said rake being located in front of said tractor and being of a width greater than that of the tread of the tractor, and a second rake comprising a rake back with permanently secured forwardly projecting tines, located at one side of said tractor back of said front rake and arranged to follow a path beyond but somewhat overlapping with that of said front rake, said rakes being capable of carrying independent loads, and vertically adjustable rake supporting and adjusting device for raising and lowering said rakes to throw the same into and out of action.

5. The structure defined in claim 4 in further combination with a third rake located at the other side of said tractor and equipped with its own vertically adjustable supporting and adjusting device to operate in a manner similar to the first noted rear or side rake, the three rakes being capable of carrying independent loads.

JOSEPH E. MURPHY.